United States Patent
Lauer et al.

(10) Patent No.: US 9,228,598 B2
(45) Date of Patent: Jan. 5, 2016

(54) FLUID COOLING DEVICE WITH A REPLENISHMENT CIRCUIT

(75) Inventors: Viktor Josef Lauer, Nalbach (DE); Giuseppe Zeolla, Minusio (CH)

(73) Assignee: HYDAC S.A., Mezzovico (CH)

( * ) Notice: Subject to any disclaimer, the term of this patent is extended or adjusted under 35 U.S.C. 154(b) by 1173 days.

(21) Appl. No.: 12/736,927

(22) PCT Filed: May 23, 2009

(86) PCT No.: PCT/EP2009/003667
§ 371 (c)(1),
(2), (4) Date: Nov. 23, 2010

(87) PCT Pub. No.: WO2009/149823
PCT Pub. Date: Dec. 17, 2009

(65) Prior Publication Data
US 2011/0079373 A1 Apr. 7, 2011

(30) Foreign Application Priority Data
Jun. 10, 2008 (DE) .......................... 10 2008 027 424

(51) Int. Cl.
| G05D 15/00 | (2006.01) |
| G05D 16/00 | (2006.01) |
| F15B 21/04 | (2006.01) |
| B01D 35/147 | (2006.01) |

(52) U.S. Cl.
CPC ............ *F15B 21/042* (2013.01); *B01D 35/147* (2013.01); *F15B 21/041* (2013.01)

(58) Field of Classification Search
CPC .... F15B 21/041; F15B 21/042; B01D 35/147
USPC .......... 165/281, 282, 283, 286, 287, 296, 297
See application file for complete search history.

(56) References Cited

U.S. PATENT DOCUMENTS

| 3,507,125 A * | 4/1970 | Falcon ................... B62D 11/18 180/308 |
| 3,583,157 A * | 6/1971 | Adams ................ F16H 61/4043 137/491 |
| 3,590,580 A * | 7/1971 | Vaughan ............... F15B 21/042 60/426 |
| 3,650,291 A * | 3/1972 | Adams ................ F16H 61/4017 137/491 |
| 3,743,011 A * | 7/1973 | Frost ............................. 165/283 |
| 4,024,909 A * | 5/1977 | Hofmann, Jr. ................ 165/297 |
| 4,360,055 A * | 11/1982 | Frost ............................. 165/283 |
| 4,669,532 A * | 6/1987 | Tejima et al. ................. 165/297 |
| 4,742,866 A * | 5/1988 | Yamanaka et al. ............ 165/297 |
| 4,813,477 A * | 3/1989 | Hansen ................. F15B 21/041 165/278 |
| 4,995,892 A * | 2/1991 | Garrett et al. ................. 165/283 |
| 5,217,085 A * | 6/1993 | Barrie et al. .................. 165/297 |

(Continued)

FOREIGN PATENT DOCUMENTS

| DE | 42 06 420 A1 | 9/1993 |
| DE | 199 17 031 C1 | 5/2000 |

(Continued)

*Primary Examiner* — Ljiljana Ciric
(74) *Attorney, Agent, or Firm* — Wenderoth, Lind & Ponack, L.L.P.

(57) ABSTRACT

A fluid cooling device has at least one heat exchanger device (10) for cooling at least one fluid and has at least one filter device (12) also for filtering the fluid conducted to a hydraulic device (14). The device has a follow-up suction device (42) that, if required, conducts fluid to the suction side of the hydraulic device fluid cooling (14).

10 Claims, 6 Drawing Sheets

(56) References Cited

U.S. PATENT DOCUMENTS

| | | | |
|---|---|---|---|
| 5,317,872 A * | 6/1994 | Ingvast | F15B 21/042 60/453 |
| 5,423,373 A * | 6/1995 | Ramberg | 165/297 |
| 5,544,699 A * | 8/1996 | Robers et al. | 165/283 |
| 5,588,485 A * | 12/1996 | Gire | 165/283 |
| 6,415,858 B1 * | 7/2002 | Getchel et al. | 165/296 |
| 6,609,564 B2 * | 8/2003 | Imaoka et al. | 165/296 |
| 6,732,791 B2 * | 5/2004 | Buysse et al. | 165/287 |
| 6,802,368 B2 * | 10/2004 | Getchel et al. | 165/296 |
| 7,878,236 B1 * | 2/2011 | Breen | 165/297 |
| 2004/0134649 A1 * | 7/2004 | Richardson et al. | 165/287 |
| 2010/0236772 A1 * | 9/2010 | Novotny et al. | 165/287 |
| 2011/0284201 A1 * | 11/2011 | Soenmez et al. | 165/287 |

FOREIGN PATENT DOCUMENTS

| | | |
|---|---|---|
| DE | 100 09 864 A1 | 9/2001 |
| DE | 101 13 179 C2 | 9/2002 |
| DE | 103 28 177 A1 | 1/2005 |
| DE | 10 2004 015 505 B4 | 10/2005 |
| DE | 10 2006 036231 A1 | 2/2008 |
| EP | 1 835 182 A2 | 9/2007 |
| WO | WO 2005/093357 A | 10/2005 |

* cited by examiner

FLUID COOLING DEVICE WITH A REPLENISHMENT CIRCUIT

FIELD OF THE INVENTION

The invention relates to a fluid cooling device with at least one heat exchanger for cooling at least one fluid and with at least one filter for filtering of the fluid that can be conducted to a consumer.

BACKGROUND OF THE INVENTION

These cooling devices can be used for a plurality of applications and are readily available in a wide variety of different embodiments on the market. Thus, for example, DE 100 09 864 A1 shows a cooling device with a cooling unit as a heat exchanger through which a fluid to be cooled, especially hydraulic fluid, flows, and with a filter unit as a filter for filtering of the fluid. The filter unit together with the cooling unit are located in a common device housing. Compared to the other known fluid cooling devices, this arrangement avoids the multi-piece structure, so that the described solution can be much more compact and light, while delivering the same performance. Moreover, the conventional tubing can be omitted due to the integration of the cooling unit and filter unit in a device housing, and error sources are precluded in this way.

In the known solution the cooling unit is preferably designed as a plate-shaped finned radiator. This plate configuration is advantageous especially for installation spaces that are kept flat. Due to the alternate arrangement of the filter unit in the left or right water box of the cooling unit, the sequence of the cooling unit and filter unit can be interchanged, allowing extensive adaptation of the cooling device to the installation conditions on site. The device housing is either assembled from sheet metal parts, but configuration as a casting, especially as an aluminum diecasting, is preferable. In spite of the compact construction, the known solution is heavy, and the structural design is relatively complicated increasing production costs.

Furthermore, DE 103 28 177 A1 discloses a fluid cooling device as a modular unit with a drive motor that drives a fan impeller that can turn in the fan housing. At least one fluid pump delivers at least one fluid from a storage tank to a hydraulic working circuit with a consumer that in principle heats the fluid in operation, and leads to an assigned heat exchanger from which cooled fluid returns to the storage tank. Parts of the storage tank comprise at least in part the fan impeller and form the fan housing made preferably of a plastic material in a lightweight construction.

In spite of their compact construction, the known solutions have good cooling and filtration results for the fluid. They can reach their limits, however, where the consumer is part of an open fluid circuit, for example, where it is designed in the form of working hydraulics or as a closed, hydrostatic drive, for example, in the form of a traveling mechanism. In these applications, problem-free operation of the consumer can be ensured where a feed pump connected upstream of the consumer also receives the full amount of fluid required by it for the consumer.

In the other known systems, such as are used especially in vehicle engineering (construction machinery) and in which to some extent the components of the fluid cooling device, such as the heat exchanger means, filter means, etc., are spatially separated from one another and can be located at widely spaced-apart locations on the vehicle, especially in replenishment processes of the feed pump, a high replenishment pressure must be made available to ensure supply of the consumer as a result of the associated long supply distances. This arrangement has the disadvantage that the gas (air) bound in the fluid and comprising in part 10% or more of the fluid volume escapes unintentionally as a result of the high replenishment pressure. This situation then leads to a "soft" fluid or oil column, and adversely affects the uniform supply of the feed pump with fluid. In turn, this "soft" fluid can lead to serious problems at the hydraulic consumer. In addition, this effect also leads to cavitation phenomena causing damage to the material, at least in the feed pump.

SUMMARY OF THE INVENTION

An object of the invention is to provide improved fluid cooling devices, while maintaining the advantages of the present devices with respect to their compact structure such that a consumer of the hydraulic circuit is continuously supplied with fluid in the required amount, preferably in filtered form, and such that cavitation phenomena in the hydraulic circuit are avoided.

This object is achieved by a fluid cooling device having a replenisher that, if necessary, conducts lacking fluid to the intake side of the consumer. The return amount of fluid coming from the device is then at least fully supplied to the hydraulic circuit, especially in the form of working hydraulics. If for some reason the hydraulic consumer, to which a feed pump is generally connected upstream, does not receive the required return amount, the replenisher permits the feed pump together with the connected hydraulic consumer to receive the required amount of fluid to the full extent, independently of this main supply, as a type of secondary supply, so that problem-free operation is achieved.

The fluid cooling device is preferably designed with its heat exchanger and filter such that the hydraulic consumer receives both cooled and filtered fluid. If problems arise on the aforementioned heat exchanger and filter, the fluid cooling device enables a bypass supply of the consumer that also includes the cold start process. Generally, full-flow return filtration is provided for the consumer.

Preferably, the replenisher is assigned a precharge valve set to a standard pressure, for example 0.5 bar, and, in this respect, ensures that the amount of fluid required by the feed pump of the consumer, for example, in the form of a hydrostatic traveling mechanism, can be drawn from the filtered return amount to thus be able to ensure the desired full-flow suction filtration. If excess amounts occur with the corresponding pressure rise at the output of the filter, they can be drained via the indicated precharge valve against the ambient pressure of a tank. For purposes of pressure limitation, unduly high pressures in the return line for the consumer cannot then occur. In this respect, protection of seals, such as shaft gaskets, is also achieved, especially in a cold start, by way of the fluid cooling device.

In one especially preferred embodiment or form of the fluid cooling device according to the invention, the replenisher can have a replenishment valve with a definable opening pressure and a replenishment line kept short in overall length for the fluid such that the replenishment pressure is optimally minimized to avoid the unwanted escape of fluid-bound gas, such as air, at least within the replenisher. Compared to the indicated prior art, this arrangement has the advantage that the above-described "soft" oil column cannot occur, thereby promoting problem-free operation of the consumer. In this way, cavitation phenomena that cause damage to the material, which generally arise when cavities form in the fluid, are also avoided. This situation is especially the case when the local static pressure in a liquid drops below a critical boundary value that is generally about the same as the vapor pressure of the liquid. Since in the solution according to the invention, in spite of the minimized replenishment pressure, the oil column leading to the consumer therefore forms a rigid supply system, and energy losses are effectively counteracted. In turn, the energy input is minimized, especially for driving of the feed pump. In this respect, relevant fuel savings can be achieved, in particular in connection with construction machinery.

In another especially preferred embodiment or form of the fluid cooling device according to the invention, the cooling device has a drive that actuates an air flow generator to generate an air flow, and a tank for storage of the fluid. The tank comprises a passage space for the air flow that holds at least in part the air flow generator. This configuration yields a compact package solution in which a heat exchanger designed as a radiator can also contain several radiator circuits.

This arrangement also ensures that part of the replenishment line can be located between the tank and the replenishment valve held in the filter housing while maintaining the short overall length, since the tank and filter are in immediate proximity to one another.

In another preferred embodiment or form of the fluid cooling device according to the invention, a holding part for the drive is an independent component on the heat exchanger. The tank follows the heat exchanger with its passage space accommodating at least in part the holder with the drive unit. This structure results in a position of the drive motor of the drive between the cooling device and a fan of the air flow device, leading to a durable motor holding solution. In this respect, low vibration operation is achieved to have a favorable effect on the replenishment behavior of the replenisher.

Other objects, advantages and salient features of the present invention will become apparent from the following detailed description, which, taken in conjunction with the annexed drawings, discloses one preferred and exemplary embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
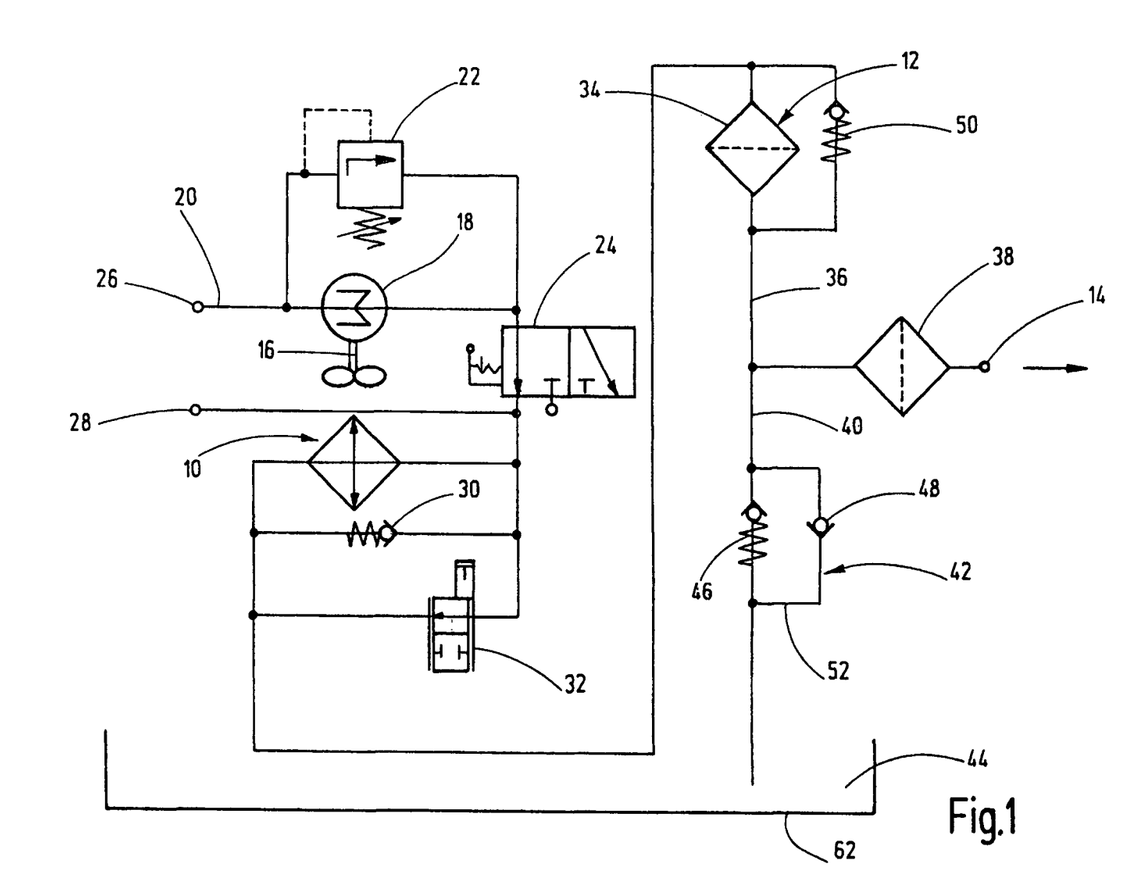
FIG. 1 is a hydraulic circuit diagram showing the fundamental structure of the fluid cooling device according to an exemplary embodiment of the invention.

The hydraulic circuit diagram of FIG. 1 shows a heat exchanger or heat exchanger means 10 for cooling of at least one fluid, especially in the form of hydraulic oil. The fluid cooling device has a filter or filter means 12 for filtering of the fluid that can be conducted to a consumer 14. The consumer 14 in this case could include a hydrostatic drive of a vehicle, especially in the form of a construction machine, which conventionally can be supplied with fluid by a feed pump (not detailed), or a group of feed pumps. The fluid cooling device has an air flow device 16 in the form of a ventilator or of fan blower. The flow device is driven via a drive 18, in this case formed from a hydraulically drivable motor. The hydraulic motor could, however, also be replaced by an electric drive motor (not shown). Parallel to a hydraulic motor 18, a pressure limiting valve 22 protects the motor from overload and is connected to the hydraulic circuit 20. In the fluid flow direction, downstream of the motor, a manually actuatable 3/2-way switching valve 24 is in its illustrated passage position establishing the fluid circuit from the motor 18 to the heat exchanger 10. In the other switching position, the valve 24 shuts off the hydraulic circuit in the direction of the heat exchanger means 10, permitting undertaking maintenance work, for example, to replace used filter elements of the filter 12 without being hampered by the afterflow of fluid in the circuit 20.

As furthermore follows from FIG. 1, the input side of the hydraulic motor 18 is connected via a first connection site 26 to the hydraulic circuit 20 with the consumer 14. A constant proportion of the amount of fluid is supplied directly to it for problem-free operation of the motor 18. By way of another second connection site 28 in the secondary branch in the fluid direction downstream of the switching valve 24, the remaining amount of fluid, optionally with a variable volumetric amount, is conducted to the heat exchanger 10. The heat exchanger is protected against overload by a conventional nonreturn valve 30. In a further parallel connection to the nonreturn valve 30 and to the heat exchanger 10, a temperature-controlled 2/2-way proportional valve 32 is connected to the hydraulic circuit 20. As the fluid temperature rises, valve 32 switches into the blocked position to supply the heated fluid exclusively to the heat exchanger 10. Since, in particular in the cold start phase, the fluid to be transported is viscous and need not be cooled in the cold state, the heat exchanger 10 can be relieved by the corresponding opening of the proportional valve 32 in the direction of the passage position.

In each instance, a definable return amount travels to the filter 12 with its first filter element 34. The fluid thus filtered, and therefore cleaned, then travels via the delivery line 36 to a second filter element 38 located upstream of the consumer 14 with the feed pump. In another secondary branch 40, the delivery line 36 then discharges into a replenishment circuit or means or replenisher 42. The replenisher in the secondary branch 40 is oriented toward the tank side 44 and has a precharge valve 46 that passes to the tank side 44 into its open position and in the opposite direction assumes its closed position shown in FIG. 1. The precharge valve 46 preferably is formed of a spring-loaded nonreturn valve. Parallel to the precharge valve 46, with the corresponding fluid linkage upstream and downstream of the precharge valve to the secondary branch 40, a replenishment valve 48 is connected to the fluid circuit 20 and, designed as a nonreturn valve, closes toward the tank side 44 and assumes the open position in the opposite direction toward the hydraulic consumer 14. While the precharge valve 46 characteristically has a pretensioning pressure of, for example, 0.5 bar, the replenishment valve 48 opens immediately if the feed pump of the consumer 14 continues to demand storage fluid from the tank side 44, when not enough fluid is continuing to flow via the filter element 34.

Furthermore, the first filter element 34 in a parallel connection has a bypass valve 50 that, designed as a spring-loaded nonreturn valve, opens toward the tank side 44 and otherwise is set to a bypass opening pressure of, for example, 2 bar. If the filter element 34 of the filter 12 is fouled and is thus blocked, the amount of fluid with the bypass valve 50 opened can travel to the hydraulic consumer 14. In this bypass case, the filtration of the return amount to the consumer 14 is done by the second filter element 38.

The preload pressure of, for example, 0.5 bar on the precharge valve 46 ensures that pressurized fluid originating from the filter 12 is available to the hydraulic consumer 14. If the preload pressure of the fluid return amount traveling from the first filter element 34 into the delivery line 36 and the secondary branch 40 rises, the precharge valve 46 opens toward the tank side and relieves the return amount until the nominal pressure provided for the consumer 14, in this case 0.5 bar, is reached. If too little fluid flows subsequently into the hydraulic circuit 20 by way of the first and second connection sites 26, 28, the intake side of the feed pump for the consumer 14 allows replenishment from a tank storage amount by having the replenishment valve 48 of the replenisher 42 open in the direction of the consumer 14 and, accordingly, ensures continued flow of the fluid medium. Accordingly, during operation of the consumer 14 at no time does undersupply of consumer fluid occur. For safety reasons, this constitutes a necessity for operation of hydrostatic traveling mechanisms.

If, at this point, as shown in the prior art, for example, the storage tank with its tank side 44 is far from the consumer 14 within the vehicle, the replenishment line 52 to which the replenishment valve 48 is connected is also lengthened. In view of this relatively long path, an increased intake capacity on the part of the feed pump is necessary to be able to adequately supply the consumer 14. However, this situation then ultimately leads to an increased replenishment pressure. In the worst case, this situation leads to the amount of gas bound in the fluid, especially in the form of air in hydraulic fluid, necessarily escaping and traveling into the replenishment line 52 of the replenisher 42. This escape of gas or air then ultimately leads to "soft" oil columns so that the operation of the feed pump connected upstream of the consumer 14 is not only adversely affected by the amount of air discharge, but also by the oil column flowing in behind, lacking the stiffness necessary for reliable operation. This air discharge can lead to operating losses of the entire device that are unfavorable in terms of energy. In view of the gas or air discharge, cavitation phenomena cannot be precluded from occurring, at least in the feed pump. This will damage it.

In addition to the purpose according to the invention, that is, making available a fluid cooling device that during operation of the consumer 14 in each instance ensures that the consumer 14 acquires its necessary amount of fluid, the fluid cooling device according to the invention serves the further objective of minimizing the pertinent replenishment pressure in this way to keep the amount of oil in the replenishment line 52 systematically stiff and to avoid the unwanted escape of the bound gas from the oil. The achievement of these objectives with a fluid cooling device in a compact design is surprising to one having ordinary skill in the art in the area of fluid engineering.

To remedy this problem, the replenisher 42 is provided with a replenishment valve 48 with the definable low opening pressure and a replenishment line 52 that is kept short in overall length for the fluid that optimally minimizes the replenishment pressure to avoid the unwanted escape of fluid-bound gas such as air within the replenisher 42, as well as relative to the downstream consumer 14 in addition to the feed pump.

Figure 2:
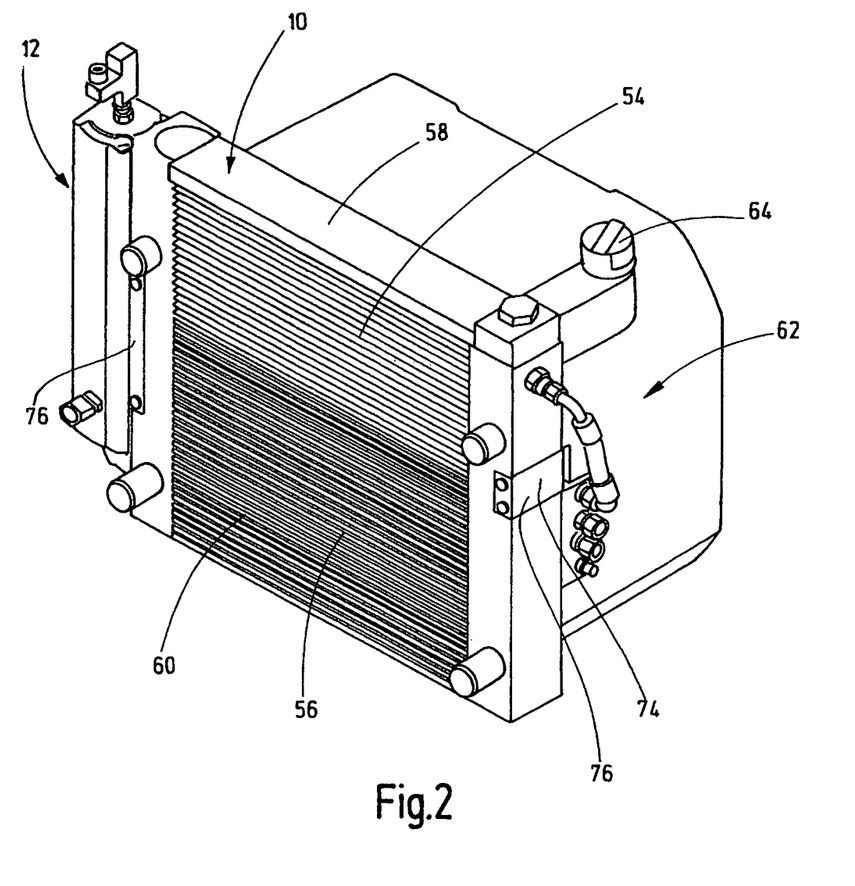
FIG. 2 is a perspective front view of the fluid cooling device of FIG. 1.

FIG. 2 shows in a perspective view the fluid cooling device as built that implements the hydraulic circuit diagram shown in FIG. 1. The fluid cooling device shown in FIG. 2 is optimized in terms of the heat exchanger 10 relative to the circuit diagram shown in FIG. 1 such that the upper region 54 is designed for cooling of oil, whereas the lower region 56 in a separate cooling circuit (not shown), is used for additional cooling of water. The heat exchanger 10 is made in the form of a rack 58, the frame accommodating within itself the fins 60 in the conventional manner as a cooling unit. Fins 60 are kept at a distance to one another to allow the passage of air. This structure of a plate radiator is conventional in the prior art so that it need not be detailed here. Viewed in the direction of FIG. 2, downstream of the heat exchanger 10, a tank 62 is connected that contains the tank side 44, as shown in FIG. 1. This tank 62 is preferably made as a hollow plastic component of optimized shape, and on its top it has a refill device 64 for fluid.

Figure 3:
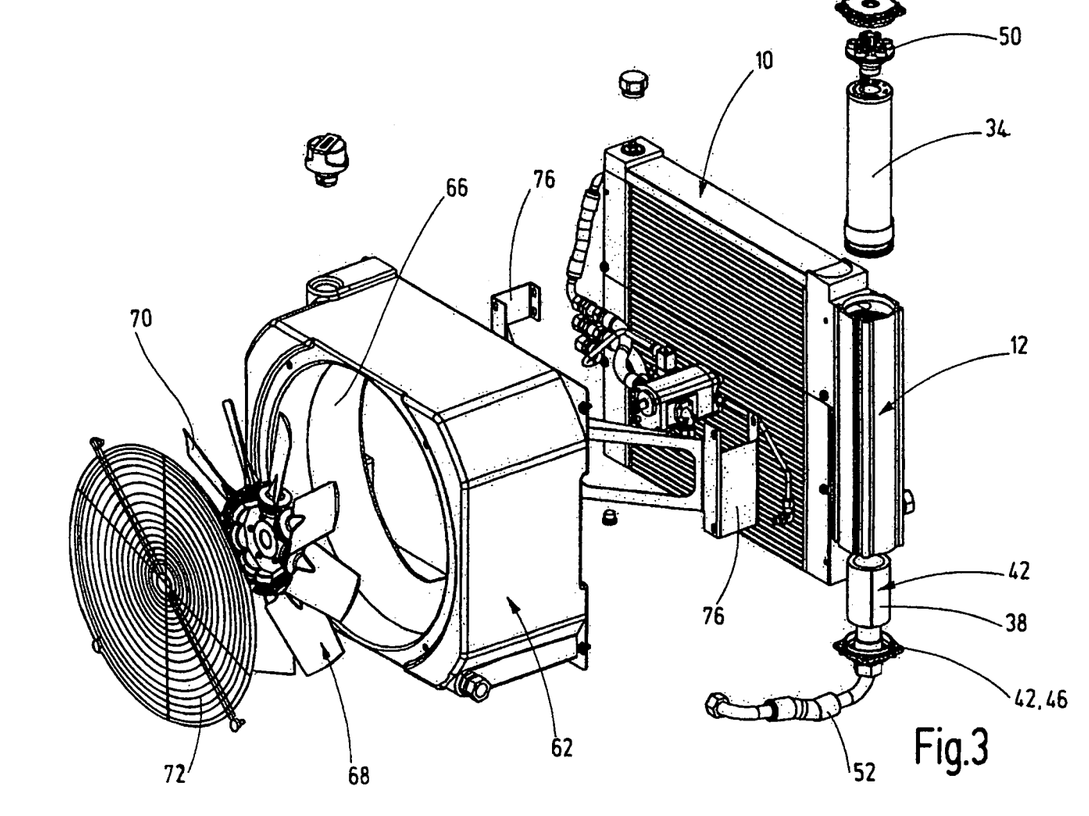
FIG. 3 is an exploded perspective view showing components of the fluid cooling device of FIG. 1 viewed from the side that is the rear in FIG. 2.
Figure 4:
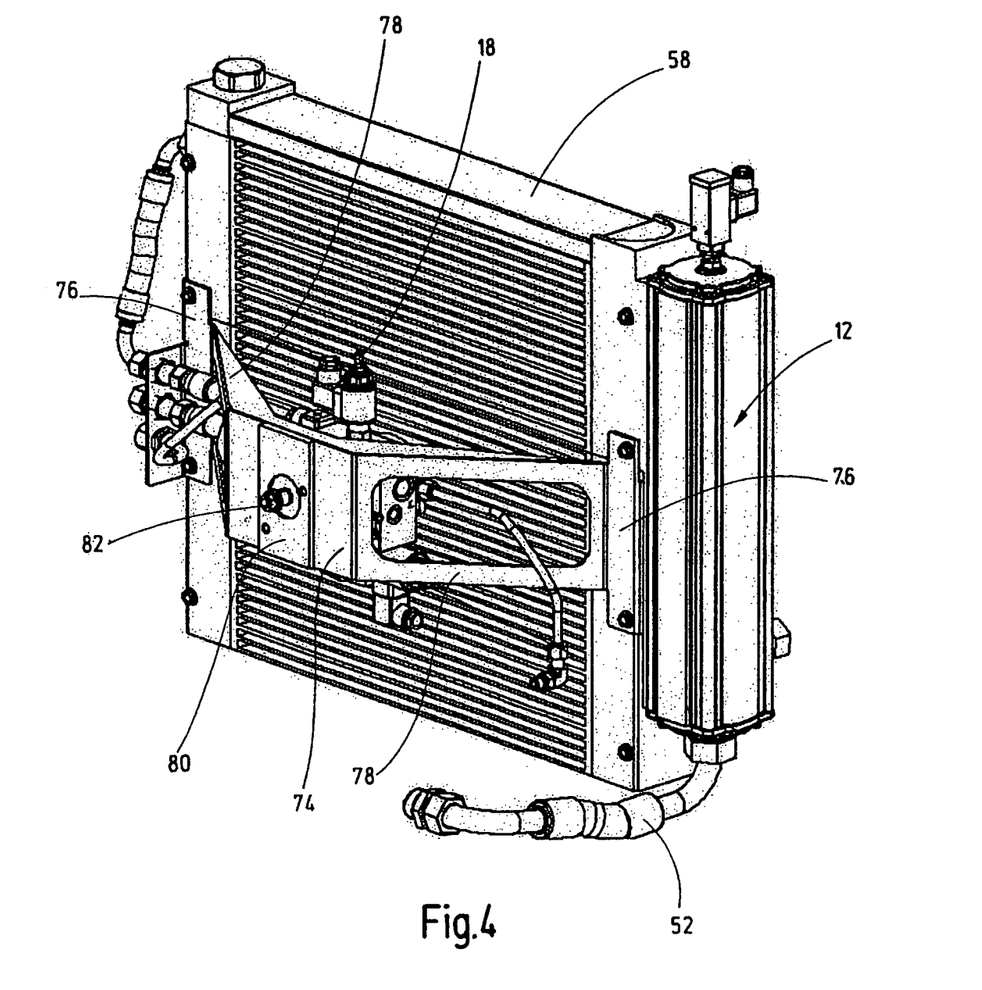
FIG. 4 is a perspective view of an extract of part of the components of FIG. 3.

According to the exploded drawing as shown in FIG. 3, the tank 62 in the shape of a frame encompasses a passage space 66 used to hold an air flow device 68, with a drivable ventilator or fan 70 covered to the outside by a protective grating 72. As the extract from FIG. 4 shows in particular, a clip-shaped holding part 74, designed as a shaped sheet-metal part, with its edge webs 76 overlaps the opposing end struts of the frame structure 58 of the heat exchanger 10 in the manner of a clamp and is fixed there. The edge webs 76 end in obliquely running holding webs 78 that border a receiving plate 80 between themselves that has a passage in the middle for the drive shaft 82 of the ventilator or fan 70. On the back side of the receiving plate 80 and therefore between the retaining part 74 and the face of the finned radiator, a hydraulic motor 18, with the valves 22, 24, 30, and 32 combined into a block is able to be supported and held at this site by the retaining part 74. The passage space 66 of the tank 62 also holds the retaining part 74 with the indicated components, with the free face of the tank 62 adjoining the frame box 58 of the heat exchanger 10 being flush and being permanently connected to it.

This structure produces an especially stiff overall system for the fluid cooling device so that low vibration operation is ensured. It also has a favorable effect on the operation of the replenisher 42. FIGS. 3 and 4 show especially the replenishment line 52. Directly connecting the bottom of the tank 62 to the heat exchanger 10 makes the fluid path for the replenishment line 52 of very short overall length, with short overall lengths for the replenishment line 52 on the order of 200 mm or less being attainable. This arrangement has no counterpart in the prior art.

The filter 12 together with the replenisher 42 is detailed below according to FIGS. 5 to 7. The two filter elements 34, 38 used are arranged coaxially to the longitudinal axis of the filter 12 on top of one another and are separated from one another by an intermediate plate 84. The filter elements 34, 38 are held in a fluid-tight housing 86 having corresponding fluid inlets and outlets for fluid transport according to the hydraulic circuit diagram shown in FIG. 1. Since this connection technique is conventional, it will not be further detailed.

Figure 5:
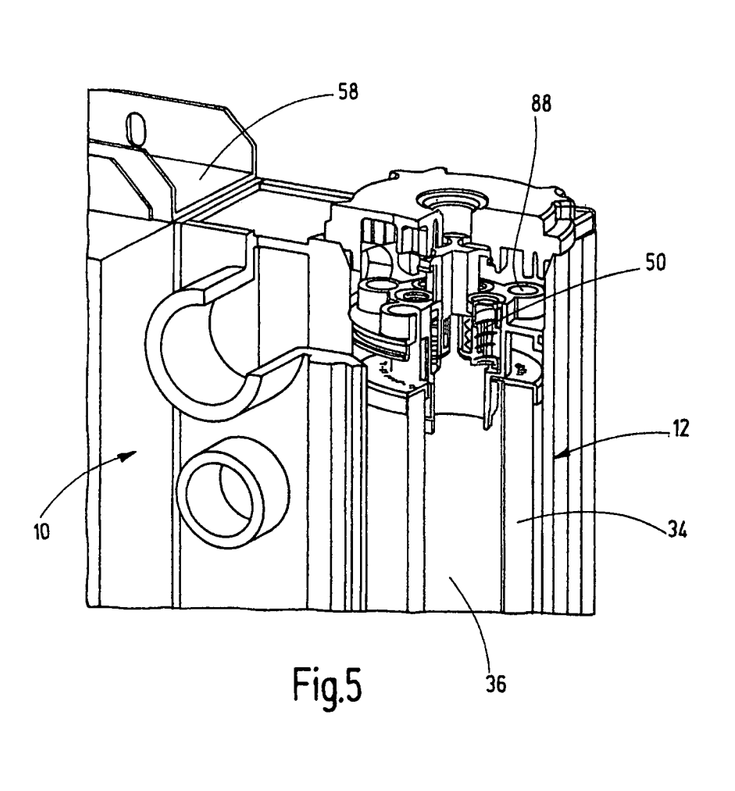
FIGS. 5 and 6 are perspective side views in section of the upper and lower ends of a filter of the fluid cooling device of FIG. 1 according to the overall representation as shown in FIG. 7.
Figure 6:
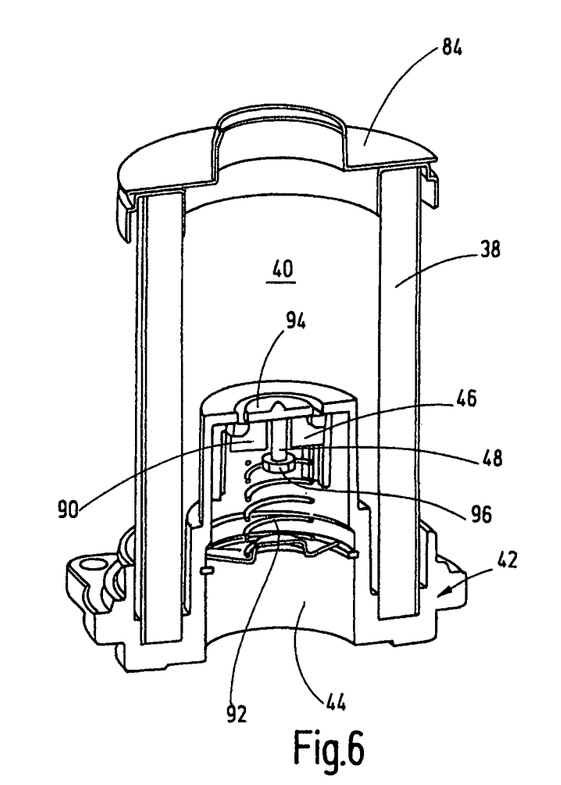
Figure 7:
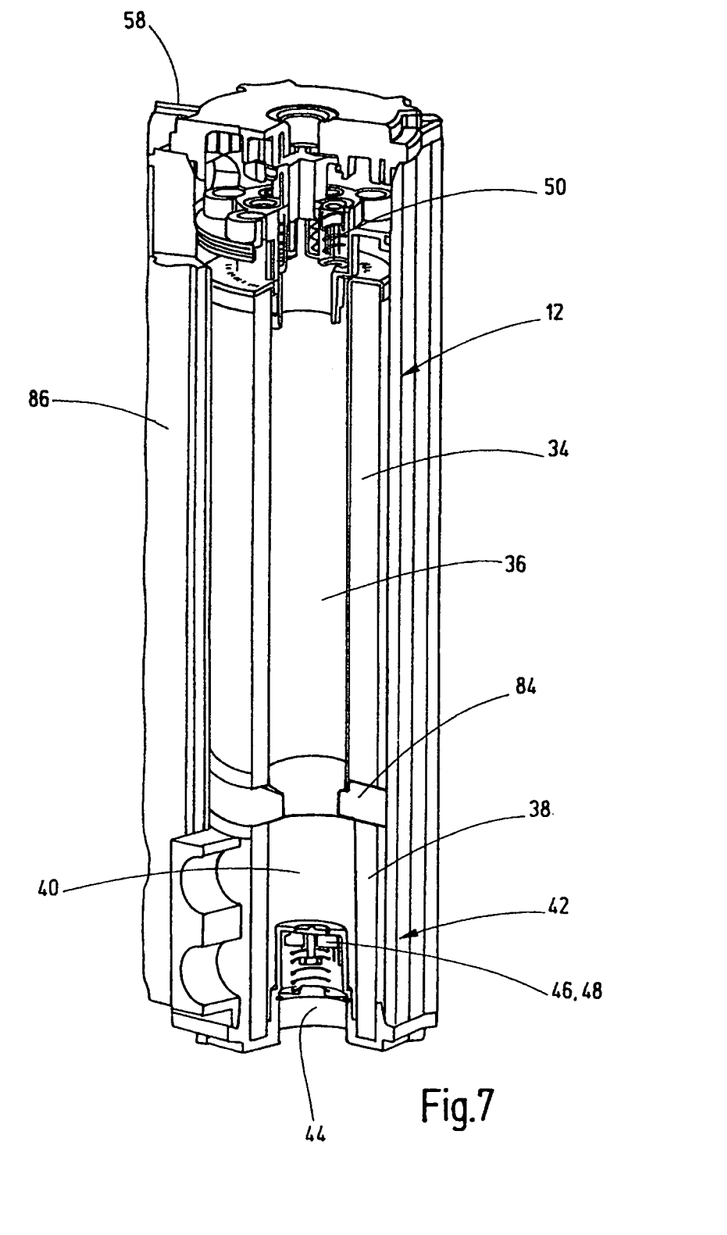
FIG. 7 is a perspective view in section of the fundamental structure of the filter with a replenisher of the fluid cooling device of FIG. 1.

FIGS. 5 and 6 each show an enlarged extract for the upper region shown in FIG. 7 and the lower region shown in FIG. 7. As FIG. 5 in particular further shows, on the top end of the filter element 34 is the bypass valve 50 composed of individual spring-loaded nonreturn valves. Adjacent to the illustrated nonreturn valves, passages 88 ensure the fluid transport to the filter element 34, where flow through this filter element 34 takes place from the outside to the inside. If the filter element 34 is clogged by dirt, the bypass valve 50 opens, and the amount of fluid travels unfiltered as return fluid into the delivery line 36 and from the delivery line 36 into the secondary branch 40. Flow through the other second filter element 38 then takes place from the inside to the outside and the filter element filters out the dirt. The fluid cleaned in this way by the second filter element 38 in the case of a bypass then travels to the consumer 14 or its upstream feed pump.

The replenisher 42 is designed on the lower end of the filter 12, viewed in the direction of FIG. 6, on the lower end on a shoulder-shaped projection into the secondary branch 40, and has the precharge valve 46 and the replenishment valve 48. If the pressure in the secondary branch 40 rises above the pressure of the precharge valve 46, the annular valve body 90 opens against the pretensioning of the spring 92. The fluid conventionally cleaned by the first filter element 34 then enters the tank 62 via the tank side 44. If a replenishment process takes place on the consumer 14, because the fluid amount with a definable pressure is lacking in the delivery line 36 of the filter 12, in the direction of FIG. 6 the disk part 94 is raised up off the annular valve carrier 90 bordered toward the top by the projection within the valve. Replenished fluid can then travel from the tank side 44 into the secondary branch 40 filtered there, and can be taken in from there by the second filter element 38 of the feed pump of the consumer 14. So that the valve 48 cannot be sucked into the secondary branch 40, on its bottom it has a screw head-shaped widening 96 that strikes a stop toward the lower face of the annular valve carrier 90. In this replenishment case, the precharge valve 46 then remains in its closed position.

In terms of the pressure opening situation, the replenishment valve 48 in case of replenishment opens almost at ambient pressure, the precharge valve 46 opens at roughly 0.5 bar, and the bypass valve 50 for the filter element 34 opens at roughly 2 bar. These pressure values are only exemplary and can assume other values. Characteristically, the opening value for the bypass valve 50 is greater than for the precharge valve 46, and that the precharge valve 46 in turn has a higher opening pressure than the replenishment valve 48. As a result of the concentric filter element arrangement 34, 38, the filter 12, combined with the replenisher 42, can be accommodated within the housing 86 in a space-saving manner.

This solution is not limited to use in hydrostatic drives with a feed pump, but can be used wherever a hydraulic consumer must be supplied with a fluid as necessary in a replenishment cycle. Between the filter element 34 of the filter 12 and the heat exchanger 10, a fluid-carrying connection of additional working hydraulics (not shown) can also discharge into the hydraulic circuit 20, where the temperature of this additional working hydraulics is far lower than the temperature of the hydrostatic traveling mechanism as a consumer 14. Preferably, the fluid connection of the additional working hydraulics to the branch site takes place between the filter element 34 and bypass valve 50.

While one embodiment has been chosen to illustrate the invention, it will be understood by those skilled in the art that various changes and modifications can be made therein without departing from the scope of the invention as defined in the appended claims.

What is claimed is:

1. A fluid cooling device, comprising:
   at least one heat exchanger for cooling at least one fluid;
   a tank with a bottom;
   at least one filter for filtering the fluid conducted to a consumer with a consumer connection; and
   a replenishment circuit for conducting replenishment fluid to an intake side of the consumer connection, the replenishment circuit including a replenishment valve with a definable opening pressure and also including a replenishment line for conducting replenishment fluid, said replenishment line having an overall length of no more than 200 mm directly connecting the heat exchanger to the bottom of the tank;
   whereby the replenishment pressure is optimally minimized to avoid an unwanted escape of fluid-bound gas at least within the replenishment circuit.

2. The fluid cooling device according to claim 1 wherein
   said filter comprises a first filter element upstream of the consumer for filtering and for returning fluid originating from the heat exchanger; and
   said replenishment circuit comprises a precharge valve for ensuring that the amount of fluid required at the consumer is made fully available as a filtered return amount.

3. The fluid cooling device according to claim 2 wherein
   the replenishment valve is configured to open in the direction of the consumer and opposite to an opening direction of the precharge valve, and is connected in parallel with the precharge valve between the tank and the consumer.

4. The fluid cooling device according to claim 3 further comprising
   a bypass valve connected in parallel to the filter element and is configured to open in the fluid direction of the consumer.

5. The fluid cooling device according to claim 4 wherein
   the replenishment circuit comprises a second filter element in the fluid direction of the consumer.

6. The fluid cooling device according to claim 5 wherein
   the filter comprises a filter housing receiving the first filter element and the second filter element in a concentric successive arrangement relative to the longitudinal axis of the filter housing, said filter housing receiving the replenishment valve, the precharge valve and the bypass valve.

7. The fluid cooling device according to claim 1 wherein
   the heat exchanger comprises an air flow generator for generating an air flow and configured to be driven by a drive unit and wherein the heat exchanger also comprises the tank for storing fluid, the tank having a passage space for the air flow and for holding the air flow generator.

8. The fluid cooling device according to claim 7 wherein
   the replenishment line extends between the tank and the replenishment valve; and
   the replenishment valve is held in a filter housing of the filter.

9. The fluid cooling device according to claim 7 wherein
   a holding part supports the drive unit on the heat exchanger and is a separate component; and wherein
   the tank is downstream of the heat exchanger with the passage space accommodating at least a part of the holding part with the drive unit.

10. The fluid cooing device according to claim 1, wherein the consumer is a hydraulic device.

* * * * *